United States Patent
Sellschopp (10) Patent No.: US 11,044,317 B2
(45) Date of Patent: Jun. 22, 2021

(54) CONTROL OF AN ONLINE SERVICE BY MEANS OF A MOTOR VEHICLE OPERATOR CONTROL DEVICE

(71) Applicant: AUDI AG, Ingolstadt (DE)

(72) Inventor: Stefan Sellschopp, Dachau (DE)

(73) Assignee: AUDI AG, Ingolstadt (DE)

( * ) Notice: Subject to any disclaimer, the term of this patent is extended or adjusted under 35 U.S.C. 154(b) by 308 days.

(21) Appl. No.: 16/120,813

(22) Filed: Sep. 4, 2018

(65) Prior Publication Data

US 2018/0375941 A1 Dec. 27, 2018

Related U.S. Application Data

(62) Division of application No. 15/526,653, filed as application No. PCT/EP2015/002178 on Oct. 30, 2015, now Pat. No. 10,069,920.

(30) Foreign Application Priority Data

Nov. 20, 2014 (DE) ...................... 10 2014 017 141.8

(51) Int. Cl.
*H04L 29/08* (2006.01)
*G06F 9/54* (2006.01)
(Continued)

(52) U.S. Cl.
CPC .............. *H04L 67/12* (2013.01); *G06F 9/451* (2018.02); *G06F 9/541* (2013.01); *G07C 5/008* (2013.01); *H04L 63/10* (2013.01); *H04L 67/02* (2013.01)

(58) Field of Classification Search
CPC ......... H04L 67/12; H04L 63/10; H04L 67/02; G06F 9/451; G06F 9/541; G07C 5/008
(Continued)

(56) References Cited

U.S. PATENT DOCUMENTS

| 6,505,100 B1 | 1/2003 | Stuempfle et al. |
| 7,506,259 B1 | 3/2009 | Narayanaswami et al. |

(Continued)

FOREIGN PATENT DOCUMENTS

| CN | 1864164 A | 11/2006 |
| CN | 201780498 U | * 3/2011 |

(Continued)

OTHER PUBLICATIONS

Aviketal., "Road Condition Monitoring and Alert Application: Using In-Vehicle Smartphone as Internet-Connected Sensor," 2012, Publisher: IEEE.*

(Continued)

*Primary Examiner* — Tuan C To
(74) *Attorney, Agent, or Firm* — Sterne, Kessler, Goldstein & Fox P.L.L.C.

(57) ABSTRACT

The invention relates to a method for controlling an online service outside the vehicle by means of an operating device of a motor vehicle, comprising the steps: Determining an operating input performed by a user on the operating device and selecting one of several service functions of the online service depending on the operating input. This selection possibility should be adapted to the vehicle type-dependent operating concept of the motor vehicle. The operating elements available on the operating device are determined and converter data, which contain a control instruction for controlling the selection of the service function depending on operation signals of the determined operating elements, are provided. The selection of the service function then takes place depending on the operating element operated during the operating input and depending on the converter data.

10 Claims, 4 Drawing Sheets

(51) Int. Cl.
*G06F 9/451* (2018.01)
*H04L 29/06* (2006.01)
*G07C 5/00* (2006.01)

(58) Field of Classification Search
USPC .................................................. 701/408
See application file for complete search history.

(56) References Cited

U.S. PATENT DOCUMENTS

| | | | |
|---|---|---|---|
| 8,095,065 | B2 | 1/2012 | Nagara et al. |
| 8,112,473 | B2 | 2/2012 | Saillet |
| 8,706,803 | B1 | 4/2014 | Whitcomb |
| 9,372,607 | B1* | 6/2016 | Penilla ................... B60L 50/66 |
| 10,069,920 | B2 | 9/2018 | Sellschopp |
| 2002/0098853 | A1 | 7/2002 | Chrumka |
| 2003/0004809 | A1* | 1/2003 | Palcic ................... G06Q 40/04 |
| | | | 705/14.18 |
| 2003/0229444 | A1* | 12/2003 | Bullock ........... G08G 1/096838 |
| | | | 701/420 |
| 2004/0150546 | A1* | 8/2004 | Choi ..................... H04L 12/282 |
| | | | 341/176 |
| 2005/0080606 | A1 | 4/2005 | Ampunan et al. |
| 2005/0114014 | A1* | 5/2005 | Isaac ...................... G01C 21/26 |
| | | | 701/465 |
| 2006/0106584 | A1 | 5/2006 | Oesterling et al. |
| 2006/0190604 | A1* | 8/2006 | Mizuno ................... H04L 67/16 |
| | | | 709/226 |
| 2008/0077317 | A1 | 3/2008 | Zabel et al. |
| 2008/0234924 | A1* | 9/2008 | Katou ................ G01C 21/3688 |
| | | | 701/532 |
| 2011/0209073 | A1 | 8/2011 | Larson et al. |
| 2012/0215641 | A1 | 8/2012 | Ohki |
| 2013/0073473 | A1 | 3/2013 | Heath |
| 2013/0145279 | A1 | 6/2013 | Ricci |
| 2013/0166188 | A1 | 6/2013 | Zheng et al. |
| 2013/0174196 | A1* | 7/2013 | Herlein .................. G06Q 30/02 |
| | | | 725/35 |
| 2013/0198156 | A1* | 8/2013 | Penikis ................... G06F 16/44 |
| | | | 707/705 |
| 2013/0204967 | A1* | 8/2013 | Seo ....................... H04L 67/303 |
| | | | 709/217 |
| 2013/0241720 | A1 | 9/2013 | Ricci et al. |
| 2013/0262275 | A1 | 10/2013 | Outwater et al. |
| 2015/0100677 | A1* | 4/2015 | Matsumoto ........... H04L 41/042 |
| | | | 709/223 |
| 2015/0121472 | A1* | 4/2015 | Sengoku ................. H04W 4/40 |
| | | | 726/4 |
| 2015/0124827 | A1* | 5/2015 | Rangaraman ....... H04L 12/4666 |
| | | | 370/392 |
| 2015/0239347 | A1 | 8/2015 | Oldewurtel |
| 2015/0268057 | A1 | 9/2015 | Tuukkanen |
| 2015/0310446 | A1 | 10/2015 | Tuchman et al. |
| 2016/0050315 | A1 | 2/2016 | Malhotra et al. |

FOREIGN PATENT DOCUMENTS

| | | | | |
|---|---|---|---|---|
| CN | 102402219 | A | * | 4/2012 |
| DE | 19909157 | A1 | | 9/2000 |
| DE | 102009012533 | A1 | | 9/2010 |
| DE | 102010055372 | A1 | | 8/2011 |
| DE | 102010039440 | A1 | | 2/2012 |
| DE | 102012009429 | A1 | | 12/2012 |
| DE | 102011112676 | A1 | | 3/2013 |
| DE | 102011116247 | B3 | * | 4/2013 ........ H04W 72/1242 |
| DE | 102012012565 | A1 | * | 12/2013 ............. H04W 4/44 |
| DE | 102013011126 | A1 | | 2/2014 |
| DE | 102012019063 | A1 | | 4/2014 |
| EP | 2752765 | A1 | | 7/2014 |
| JP | 2005094497 | A | * | 5/2000 |
| RU | 2209739 | C1 | * | 8/2003 |
| WO | WO-2005059706 | A2 | * | 6/2005 ............. H04L 67/12 |
| WO | WO-2007109010 | A2 | * | 9/2007 ........ B60R 16/0232 |
| WO | WO 2012/174510 | A1 | | 12/2012 |

OTHER PUBLICATIONS

Chung-Sheng et al., "Distributed Application Service for Internet Information Portal," 2000, vol. 4, Publisher: IEEE.*
Byung et al., "Development of Insurance Server System based on Vehicle Driving Information," 2012, Publisher: IEEE.*
Cao et al., "A Remote Vehicle Diagnosis and Maintenance System Based on Internet," 2010, Publisher: IEEE.*
English-language abstract of German Patent Application Publication No. 10 2010 039 440 A1, published Feb. 23, 2012; 1 page.
English-language abstract of German Patent Application Publication No. 10 2009 012 533 A1, published Sep. 23, 2010; 2 pages.
English-language abstract of German Patent Application Publication No. 10 2013 011 126 A1, published Feb. 27, 2014; 2 pages.
English-language abstract of German Patent Application Publication No. 10 2010 055 372 A1, published Aug. 25, 2011; 1 page.
English-language abstract of German Patent Application Publication No. 10 2011 112 676 A1, published Mar. 7, 2013; 1 page.
English-language abstract of German Patent Application Publication No. 10 2012 009 429 A1, published Dec. 20, 2012; 2 pages.
International Search Report and Written Opinion of the International Searching Authority directed to related International Patent Application No. PCT/EP2015/002178, dated Jan. 22, 2016, with attached English-language translation; 21 pages.
International Preliminary Report on Patentability directed to related International Patent Application No. PCT/EP2015/002178, dated Apr. 19, 2017, with attached English-language translation; 13 pages.

* cited by examiner

CONTROL OF AN ONLINE SERVICE BY MEANS OF A MOTOR VEHICLE OPERATOR CONTROL DEVICE

TECHNICAL FIELD

The invention relates to a method for controlling an online service outside the vehicle by means of an operating device of a motor vehicle. A service function of the online service is selected and activated by the method depending on an operating input of a user of the operating device. The invention also includes a server device for providing the online service as well as a motor vehicle with the described operating device.

BACKGROUND

In a motor vehicle, a service based online can be provided, wherein a service in this case constitutes a collection of several service functions provided by a server arrangement, for example, via the internet. For example, an online weather service can be provided, wherein the selection of a geographical location and/or a forecast period for the weather can, for example, be provided as service functions. The provision of the online service in the motor vehicle can be made possible by means of a network connection, via which the motor vehicle can be connected to a stationary network, in particular the internet. Online services are generally provided as browser-based services, i.e. a graphical user interface (GUI) is presented through an internet browser in the motor vehicle.

If possible, the integration of the online service into the motor vehicle should take place without any interruption in the presentation, i.e. there should be no visible differences for the user between texts and/or lists of an in-vehicle onboard service, which is provided independently of the network connection in the motor vehicle, and an online service. Since the graphical presentation and the operation of onboard services in a motor vehicle depend on the vehicle type, a server device for each vehicle type must also be provided on the internet accordingly, with such a server device implementing or providing the online service separately for each vehicle type and, in doing so, vehicle-specific equipment features, such as the available operating elements (rotary controller or touch-sensitive surface, i.e. touchpad) on the one hand and/or graphical design of the graphical user interface on the other hand.

The provision of an already existing online service for a new vehicle model thus generates high costs in the development of the motor vehicle on the server side as well, i.e. in the maintenance of the server device. The development of the motor vehicle and the server-side online services must take place at the same time, which causes dependencies and increased complexity. For a vehicle type with a novel operating element, the online services must partially even be newly developed as a result of deviating operating concepts, which reduces synergies and obstructs the potential for development, thus impeding the development of new online services.

It is known from DE 10 2009 012 533 A1 that data from a data source outside the vehicle can be compiled depending on a dynamic query profile and prepared for an output device of a motor vehicle. The query profile describes the vehicle type and/or user-specific preferences in the selection of the data.

DE 2012 019 063 A1 describes a method for providing data in a motor vehicle, whereby the method provides a search result of a data source outside the vehicle and provides the user on a display unit of the motor vehicle only such applications for activation that are actually suitable for presenting the search results kept available.

DE 10 2010 039 440 A1 describes a control unit for a motor vehicle, which can be arranged at any arbitrary location in the motor vehicle and controls display devices of the motor vehicle to the effect that each data source can transmit data to each output unit and that the data are adapted to the output on the respective output unit in the process.

SUMMARY

The invention is based on the task of controlling an online service outside the vehicle from a motor vehicle by means of an operating device of the motor vehicle.

The task is achieved by the objects of the independent claims. Advantageous further developments of the invention are given by the features of the dependent claims.

A method for controlling the online service outside the vehicle by means of the operating device of the motor vehicle is provided according to the invention. The online service can, for example, be provided as internet portal by a server device of the internet. In other words, an online operating interface, i.e. an operating interface reachable on the server device via a network connection, can be provided by the server device, wherein the operating interface presents the service functions for selection. In a manner known per se, such as is known, for example, from a browser-based operation, an operating input is determined performed by a user on the operating device. The operating input can, for example, be a "click" on an operating surface, such as a selection button. Depending on the operating input, one of several service functions of the online service is selected, such as the display of a weather forecast in case of an online weather service. The selection in this case means that the service function is activated and/or marked for activation.

Now, in order to operate or control the online service from the motor vehicle, without the online service having to be adapted for this purpose to the special or specific motor vehicle, i.e. to the available operating elements, the invention provides the following. The vehicle-specific operating elements available on the operating device of the motor vehicle are determined. For example, it is determined whether the motor vehicle has a rotary push controller or a touch-sensitive operating surface (touchpad) or a button bar. For this purpose, a general vehicle type can for example be determined, if the available operating elements are defined or determined by the vehicle type. Converter data are, furthermore, provided. The converter data contain a control instruction for controlling the selection of a service function of the online service depending on operation signals of the operating elements determined. The converter data thus constitute a mapping instruction in order to map the operation signals generated when operating the operating elements to control signals for the selection of a service function. A turn signal of a rotary push controller can thereby be mapped, for example, to a control signal for a selection menu. A character trace on a touchpad can thereby be mapped, for example, to a control signal for a mouse pointer. Thus, in the method, the selection of the service function is generally performed depending on the operating element operated by the operating input and depending on the converter data.

The invention results in the advantage that the online service can be provided independently of the vehicle type and the actual selection of the service functions is controlled in a vehicle-specific manner by means of the converter data. By providing suitable converter data for a given vehicle type, a motor vehicle of this vehicle type can thereby control the online service, without the online service itself having to be adapted.

In a further development of the invention, the converter data are provided by a presentation layer on the server device providing the online service. The presentation layer receives the operation signals of the operating elements from the motor vehicle and maps them to the control signals for selecting the service function. This results in the advantage that the motor vehicle itself does not have to be able to process the converter data.

In another aspect of the invention, a server device is provided. This server device according to the invention comprises a communication device for connecting the server device to the internet, and a processor unit. The communication device can, for example, be implemented based on an Ethernet controller. The processor unit is designed to provide an online service that includes service functions that can be executed independently of the vehicle type. The processor unit is, furthermore, designed to determine the respective vehicle type of each motor vehicle requesting the online service via a network connection. Depending on the determined vehicle type, the processor unit provides converter data. These converter data contain the control instruction for controlling a selection of one of the service functions depending on the operation signals from operating elements of an operating device of the motor vehicle.

These converter data can then be used in the manner described by a presentation layer of the server device.

Additionally or alternatively, the converter data can also be sent from the server device via the network connection to the motor vehicle. In this case, the motor vehicle must be designed to process the converter data itself. For this purpose, an aspect of the invention provides a corresponding motor vehicle. The motor vehicle according to the invention is designed to receive the converter data from a server device outside the vehicle via a network connection for an operating device of the motor vehicle. The motor vehicle is, furthermore, designed to select one of the service functions of the online service via the network connection by means of the received converter data depending on a user input received on the operating device and depending on the converter data. The motor vehicle according to the invention has the advantage that it can be reconfigured dynamically for controlling different online services by receiving the respective converter data.

Further developments of the invention are described below, wherein the further developments are respectively described in connection with the method according to the invention. The invention also includes further developments of the server device according to the invention and of the motor vehicle according to the invention, whereby such further developments have the same features as described in the following in connection with the further developments of the method according to the invention.

In a further development, the converter data are transmitted as display rules to the motor vehicle as already described in connection with the motor vehicle according to the invention.

In a further development, the converter data contain not only the described control instruction for mapping the operation signals of the operating elements to a selection of a service function. In addition, the converter data contain a graphic configuration or display instruction for display elements of the online service. The display instruction determines at least one graphical property of the display elements. This embodiment provides that a display instruction is also provided in the motor vehicle to a display unit of the operating device for in-vehicle onboard services, which are provided independently of a network connection. This display instruction determines at least one graphical property of the display elements of the onboard services, i.e. in particular its appearance or looks. For example, a background color and/or a text size and/or a graphical design of line elements can be determined by the graphic configuration. According to the further development, the display instruction for the onboard service and the display instruction for the online service now match each other. This results in the advantage that the user cannot visually distinguish the onboard services from the online service as far as the appearance of the respective graphical user interface is concerned. This increases the degree of integration of the online service into the operating concept of the motor vehicle.

A further development provided for this purpose has a blocking mechanism. The blocking mechanism blocks a transmission of the display instruction for the online service depending on a rejection input of the user of the motor vehicle. This results in the advantage that the user has control over the installation of data external to the vehicle in the user operating device.

In a further development of the invention, a list of the online services available on the server device is sent to the motor vehicle when a connection to a server device providing the online service is being established. This is, however, not a general list, but the list that is generated depending on the vehicle-specific and/or user-specific identification data. This results in the advantage that the motor vehicle receives a list of online services that are actually usable or operable by the user in the motor vehicle.

According to one embodiment, the identification data mentioned contain equipment data describing technical equipment of the motor vehicle. This results in the advantage that the technical framework conditions present in the motor vehicle are taken into consideration in the selection of the online services.

Additionally or alternatively, the identification data can contain authorization data, which describe a licensing of the online services for the user. The selection of the online services on the server device can thus be limited depending on what online services the user has an access authorization to.

In a further development of the invention, the converter data and/or the online service are provided in a versioned manner. In other words, a version identification is stored for each version of the online service provided on the server device. This results in the advantage that in case of a further development of a vehicle type and/or of the online service, it can nonetheless be ensured in an automated manner that a specific motor vehicle is provided with a suitable online service, the service functions of which can be activated and/or used and/or performed in the motor vehicle.

BRIEF DESCRIPTION OF THE DRAWINGS

The accompanying drawing, is incorporated herein and form a part of the specification, illustrate the embodiments of the present disclosure and, together with the description, further serve to explain the principles of the embodiments and to enable a person skilled in the pertinent art to make and use the embodiments.

In the following, exemplary embodiments of the invention are described. Shown are.

DETAILED DESCRIPTION

The exemplary embodiments described below are preferred embodiments of the invention. In the exemplary embodiments, however, the described components of the embodiments respectively represent individual features to be considered independently from one another, whereby such features also further develop the invention independently of one another and are thus also to be considered as part of the invention individually or in a different combination than the one shown. Additionally, the described embodiments can also be complemented by additional, already described features of the invention.

In the figures, elements which are functionally equivalent are respectively provided with the same reference symbols.

Figure 1:
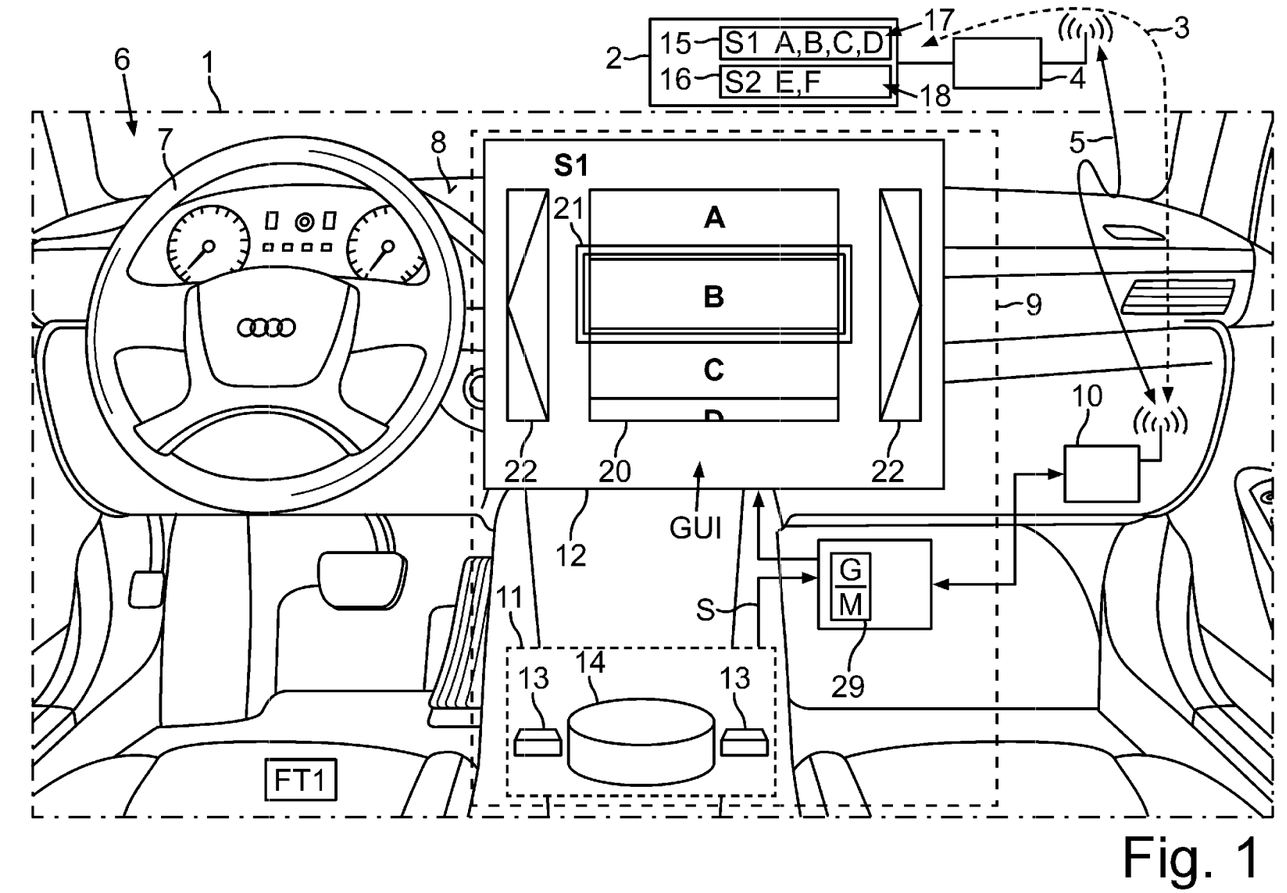
FIG. 1 is a schematic representation of an embodiment of the server device according to the invention and the motor vehicle according to the invention.

FIG. 1 shows a motor vehicle 1 and a server device 2 outside the vehicle, whereby the server device can be connected to the motor vehicle via a network connection 3. The network connection 3 can, for example, be provided via the internet 4 and a radio link 5.

The motor vehicle 1 can, for example, be an automobile, in particular a passenger car. FIG. 1 shows a vehicle interior space 6 with a steering wheel 7, a dashboard 8, an operating device 9, and a radio module 10 of the motor vehicle 1. By means of the radio module 10, the radio link 5 to the internet 4 can be provided. The radio equipment 10 can, for example, be a mobile radio module, such as a UMTS module (UMTS—Universal Mobile Telecommunications System) or an LTE module (LTE—Long Term Evolution) or a WLAN module (WLAN—Wireless Local Area Network).

The operating device 9 can comprise an operating unit 11 and a display unit 12. A control unit 13 of the operating device 9 can be provided, through which operation signals S from the operating elements 13, 14 can be generated depending on an operation by a user (not shown). The display unit 12 can, for example, be provided by a screen, which can be arranged on the dashboard 8.

The server device 2 can, for example, be provided by one or more computers. The server device 2 can be connected to the internet via a communication device, such as an Ethernet controller or a router. The server device 2 can be designed to provide one or more online services 15, 16 on the internet 4. Each online service 15, 16 can respectively include service functions 17, 18. The online service 15 (named S1) shown in FIG. 1 can, for example, comprise the service functions a, b, c, d. The online service S1 can, for example, be a weather forecast. The service functions a, b, c, d can, for example, include: a) location selection, b) selection of a time period, c) display weather history, d) display cloud image. The online service 16 (named S2) can, for example, be a news service. The service functions e, f can, for example be: e) selection of a topic, f) displaying additional news regarding a news article.

In the example illustrated in FIG. 1, the online service 15 (S1) was requested via the network connection 3 by the operating device 9. Now, the problem is how service functions a, b, c, d are made available to the user in the motor vehicle 1 by the online service S1. On the one hand, a selection of service functions a, b, c, d must be made possible on the display unit 12. On the other hand, the user must be able to use the operating unit 11 with its operating elements 13, 14 in order to make the selection.

Figure 2:
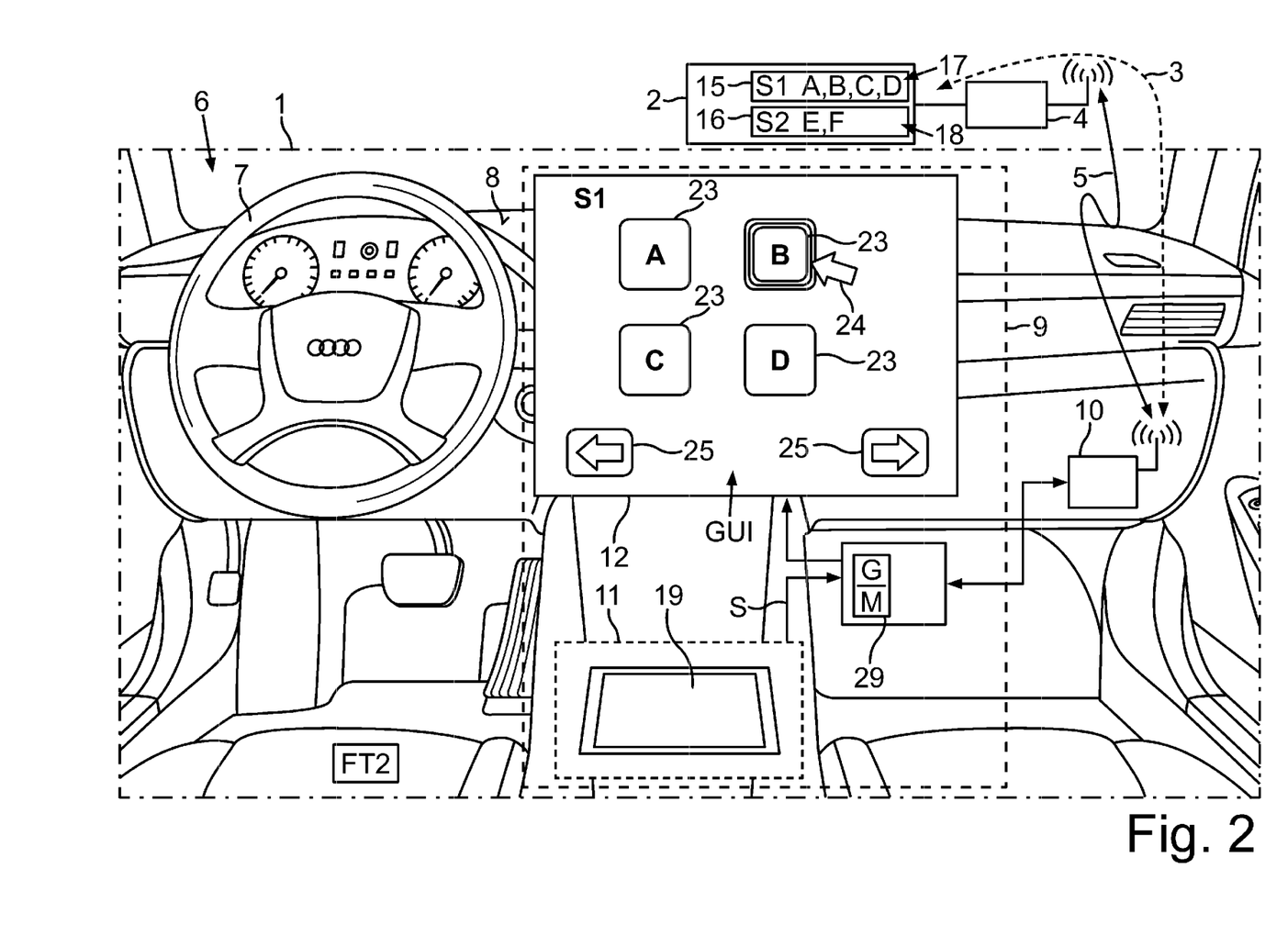
FIG. 2 is a schematic representation of another embodiment of the motor vehicle according to the invention, whereby the motor vehicle has a different vehicle type than the motor vehicle of FIG. 1.

For better clarification of the problem, reference is made to FIG. 2.

FIG. 2 illustrates another motor vehicle, wherein for the sake of simplicity of the illustration, the same reference symbols as in FIG. 1 were used for elements corresponding to one another. In order to distinguish them, the vehicles differ in their vehicle type: FT1, FT2. For example, vehicle type FT1 can be a compact car and vehicle type FT2 can be a luxury limousine. The equipment and the vehicle type-specific design of the display contents GUI on the display unit 12 differ accordingly.

An important difference of the motor vehicle in FIG. 2 is that its operating unit 11 does not have to comprise one of the operating elements 13, 14, but it can comprise a operating element 19 different from it. It can, for example, be assumed that the operating elements 13 respectively constitute a button and the operating element 14, a rotary push controller. In contrast thereto, the operating element 19 is, for example, a touchpad. Accordingly, different input modes or input possibilities arise.

Another important difference is how the selection of service functions a, b, c, d is visualized on the display unit 12 in a manner appropriate for the operating unit 11. FIG. 1 shows that a selection menu 20 is provided for the selection, in which a selection element 21 can be moved to service function a, b, c, d to be selected. This can, for example, take place depending on operation signals S of the operating element 14, i.e. the rotary push controller, for example. By means of control panels 22, switching between individual service functions S1, S2 is, for example, possible.

Operating a rotary push controller can be different from the operating possibilities of the operating element 19, i.e. of the touchpad, for example. For this reason, the selection of service function a, b, c, d can be realized in the motor vehicle of FIG. 2 by selection fields 23, which can be selected, for example, by means of a pointer 24, which can be positioned on the operating elements 19 by touching and swiping. Additional control panels 25 can be provided for switching between the online services S1, S2.

However, on the server device 2, it is not necessary to respectively provide a separate implementation of the online services S1, S2 for the different operating units 11 of the vehicle types FT1, FT2. The same implementations of service functions a, b, c, d of the online service S1 and accordingly also service functions e, f of the online service S2 can be provided.

Figure 3:
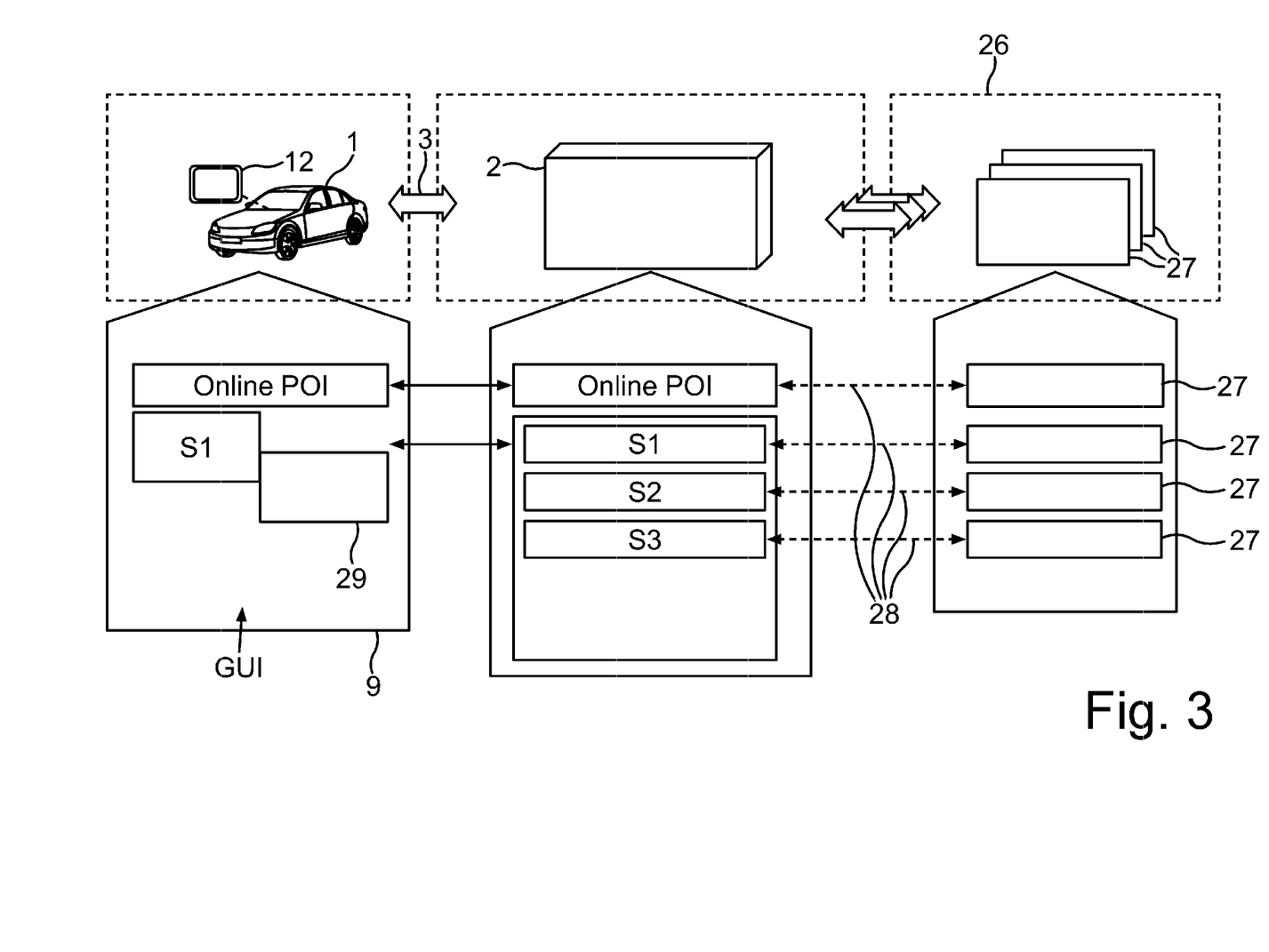
FIG. 3 is a schematic representation of the motor vehicle according to the invention and a server device according to the invention as well as the distribution of functions between these two according to an embodiment of the invention.
Figure 4:
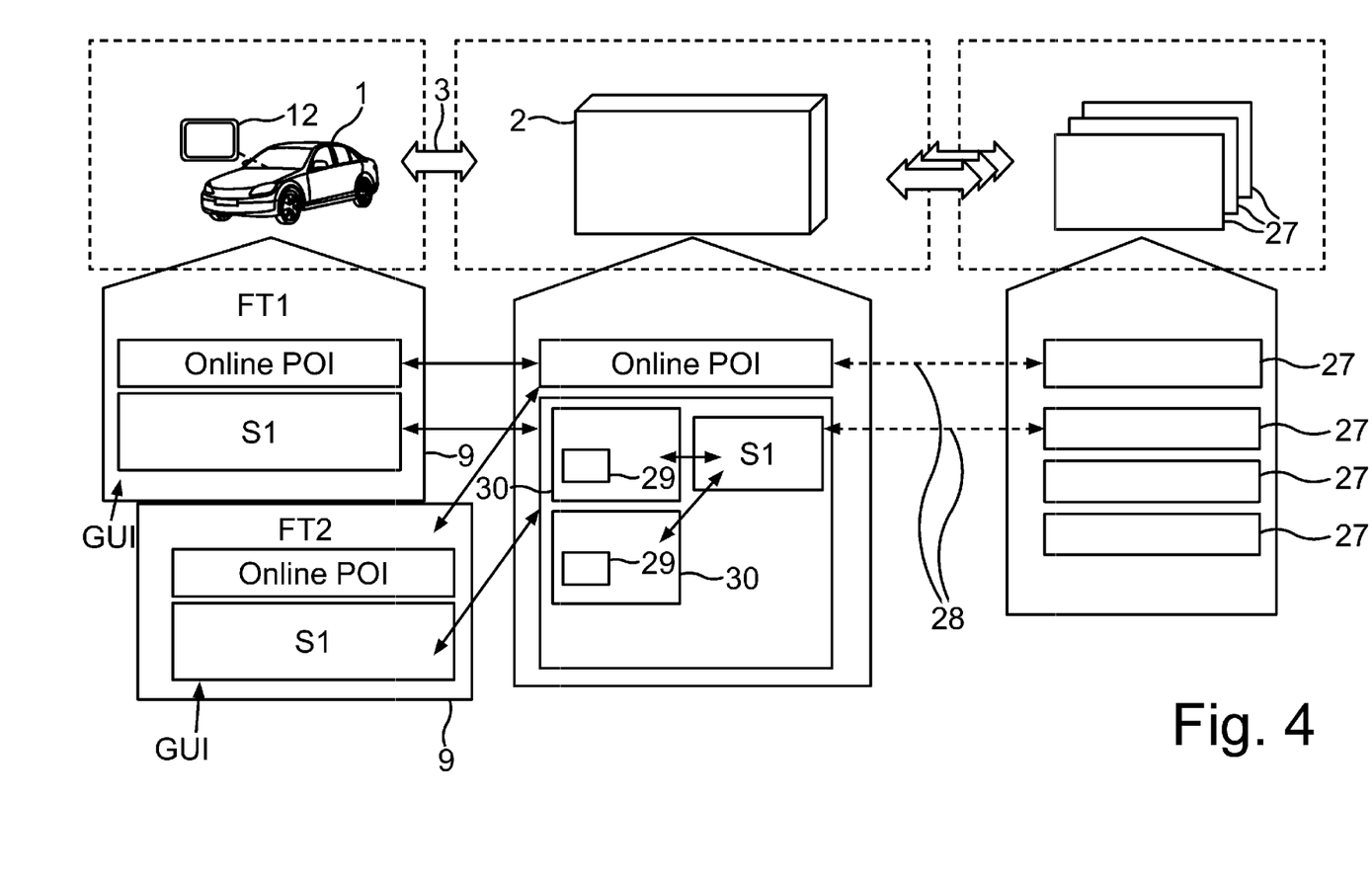
FIG. 4 is a schematic representation of the distribution of an online service according to another embodiment of the method according to the invention.

For converting or adapting the operation signals S of the respective operating units 11 of the vehicle types FT1, FT2 and the vehicle type-specific graphical user interfaces GUI of the display units 12 to the online services 15, 16, two concepts can be provided, which are illustrated in FIG. 3 and FIG. 4.

Below, the adaptation concept according to FIG. 3 is first discussed, whereby this adaptation concept can also be the basis for the exemplary embodiments of FIG. 1 and FIG. 2.

In FIG. 3 and FIG. 4, the network connection 3 between the motor vehicle 1 and the servicer device 2 is once again illustrated. In addition, the display content 9 on the display unit 12 and the available online services S1, S2, S3 on the server device 2 are shown schematically. It is, furthermore, shown that a search function (not shown in FIG. 1 and FIG. 2) for navigation destinations (Online POI—Points of Interest) can be provided additionally. As a result of their independence from the vehicle types FT1, FT2, each of the online services S1, S2, S3 and the online search can even be provided outside the server device 2 itself on the internet by third-party providers 26, so-called content servers 27. Even the links of the online service S1, S2, S3 and the online search Online POI of the server device 2 to the content servers 27 (content providers) can be designed variably, which is symbolized by dashed service links 28.

In order to be able to operate the online service S1, for example, converter data 29 can be provided by the server device 2 for the respective motor vehicle 1 according to or depending on the vehicle type FT1. The converter data 29 can contain a control instruction M (M—mapping—assignment rule) and a graphical display instruction G. The converter data 29 can, for example, be provided as a file in the format "State Chart XML."

The control instruction M can describe or set or provide the way the selection of a service function a, b, c, d is to be performed by the operation signals S of the operating elements 13, 14 in vehicle type 1 or of the operating element 19 in vehicle type FT2. In case of a rotary push controller, it can, for example, be defined that a right turn and a left turn respectively bring about a change of the selection between service functions a, b, c, d. A button, such as the operating element 13, can be assigned to the effect that a change between the service functions S1, S2 takes place. The display instruction G can, for example, determine in a vehicle type FT1 that the operating menu 20 and the selection element 21 are displayed. The operating surfaces 22 can be defined in the same way.

The display instruction G for the vehicle type FT2 can define the selection surfaces 23 and the selection possibilities by means of the pointer 24 in the manner described. The buttons 25 can additionally be defined.

The motor vehicle 1 can, for example, report its respective vehicle type FT1, FT2 to the server device 2.

A user of a motor vehicle 1 of the vehicle type FT1 can now make a selection by operating the operating elements 13, 14 using the graphical user interface GUI as it arises by means of the display instruction G, since the operation signals S are suitably mapped to selection signals by means of the control instruction M or transmitted. The selection signal can be transmitted as a function selection to this device 2, whereby the selected service function can then be activated on the server device 2.

FIG. 4 illustrates an alternative execution, in which the converter data 29 do not have to be transmitted to the respective motor vehicle. Instead, a presentation layer 30 is provided on the server device for each vehicle type FT1, FT2, via which presentation layer the network connection is routed from the respective motor vehicle 1 to the online service S1, S2, S3. In other words, the motor vehicle 1 and the respective online service S1, S2, S3 are connected via a vehicle-specific presentation layer 30. In the presentation layer 30, vehicle type-specific converter data 29 can respectively be kept available or provided.

In both variants according to FIG. 3 and FIG. 4, the provision of online services thus takes place such that no direct dependence of the server-side online services on the respective operating concept exists as it is executed in each vehicle type FT1, FT2 by the provided operating units 11 and the display unit 12. There is a conversion instruction (converter data) of the available contents into the respective operating elements and display requirements of the respective vehicle type. This conversion instruction for a defined version of a service is preferably also versioned and to be transmitted to the respective vehicle as illustrated in FIG. 3. The provision of the actual service contents is also preferably versioned.

By distributing the online services into a portion independent of the vehicle type and the vehicle type-specific converter data, development resources on the server side are saved. This results in quicker development cycles, and parallel developments of several services can be executed. A uniform operation of the services creates additional synergies. Times, in which services are not available as a result of modifications of the online services, are reduced and even completely avoided in some circumstances.

Establishing a connection, i.e. in particular requesting a service, via a network connection 3 can take place as follows. The vehicle requests the services from the server. Based on its technical possibilities and authorizations (licenses), the motor vehicle receives the list of services from the server as a response. During the request of the list of services, an authentication of the vehicle can also take place.

In or with the list of services, the interface description, i.e. the available service functions, is respectively returned to the vehicle as well as an identifier of the most current instruction for this vehicle/end device. The vehicle checks if the display instruction provided in the vehicle is still current. The user can optionally agree to the downloading of the current display instruction; otherwise, the download takes place in the background. The vehicle retrieves the service from the server according to the interface description from the server. The data are then adapted according to the display instruction to the operating concept of the vehicle. This results in a uniform provision of the respective services.

By means of the converter data, the presentation and the interaction possibility for the respective vehicle type are thus derived or deduced or executed. By means of the presentation layer on the server device, the data are delivered via the network connection 3 in the format respectively required by the vehicle type. The presentation layer then accesses the standard online services, which are independent of the vehicle, in order to execute the online service.

Overall, the example shows how online services can be provided in motor vehicles by the invention.

What is claimed is:

1. A server device, comprising:
a communication device configured to connect the server device to an internet; and
a processor unit configured to:
provide an online service to a motor vehicle in response to the motor vehicle requesting the online service via a network connection, the online service comprising a plurality of service functions to be executed independently of a vehicle type of the motor vehicle,
determine the vehicle type of the motor vehicle, and
provide vehicle-specific converter data to the motor vehicle, wherein the vehicle-specific converter data comprises a control instruction for controlling a selection of one of the plurality of service functions based on operation signals received from operating elements of an operating device of the motor vehicle,
wherein the server device is configured to:

generate a list of a plurality of online services available on the server device and operable by the operating device of the motor vehicle, wherein the list is generated based on vehicle-specific identification data comprising equipment data that describes technical equipment of the motor vehicle and technical framework conditions of the motor vehicle, and send the generated list of the plurality of online services available on the server device and operable by the operating device to the motor vehicle, wherein the generated list specifies one or more of the plurality of online services that are operable by the motor vehicle based on framework conditions of the motor vehicle.

2. The server device of claim 1, wherein the vehicle-specific converter data is provided by a presentation layer on the server device.

3. The server device of claim 1, wherein the generated list is generated based on user-specific identification data comprising authorization data that describes a user license of the online service.

4. The server device of claim 1, wherein the vehicle-specific converter data and/or the online service are provided in a versioned manner.

5. The server device of claim 1, wherein the vehicle-specific converter data comprises a corresponding display instruction for display elements of the online service.

6. The server device of claim 5, wherein the server device is further configured to block transmission of the corresponding display instruction using a blocking mechanism, in response to a rejection input from a user at the operating device.

7. The server device of claim 1, wherein an online service of the plurality of online services is an internet portal.

8. The server device of claim 1, wherein an online service of the plurality of online services is an online weather service.

9. The server device of claim 1, wherein the communication device is implemented based on an Ethernet controller.

10. The server device of claim 2, wherein the presentation layer is specific to the vehicle type of the motor vehicle.

* * * * *